United States Patent
Hung et al.

(10) Patent No.: US 9,715,320 B2
(45) Date of Patent: Jul. 25, 2017

(54) IN-CELL TOUCH DISPLAY PANEL

(71) Applicant: MStar Semiconductor, Inc., Hsinchu Hsien (TW)

(72) Inventors: Guo-Kiang Hung, Hsinchu County (TW); Chi Kang Liu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 93 days.

(21) Appl. No.: 14/875,071

(22) Filed: Oct. 5, 2015

(65) Prior Publication Data

US 2016/0109993 A1    Apr. 21, 2016

Related U.S. Application Data

(60) Provisional application No. 62/065,021, filed on Oct. 17, 2014, provisional application No. 62/068,005, filed on Oct. 24, 2014.

(51) Int. Cl.
  *G06F 3/045* (2006.01)
  *G06F 3/044* (2006.01)
  *G06F 3/041* (2006.01)

(52) U.S. Cl.
  CPC ............ *G06F 3/044* (2013.01); *G06F 3/0412* (2013.01); *G06F 2203/04103* (2013.01)

(58) Field of Classification Search
  USPC .................................. 345/173, 174, 156, 211
  See application file for complete search history.

(56) References Cited

U.S. PATENT DOCUMENTS

| | | | | |
|---|---|---|---|---|
| 2004/0217945 A1* | 11/2004 | Miyamoto | ............ | G06F 3/0412 345/173 |
| 2008/0180407 A1* | 7/2008 | Utsunomiya | ......... | G06F 3/0412 345/174 |
| 2009/0174681 A1* | 7/2009 | Chang | .................... | G06F 3/0412 345/173 |
| 2010/0194704 A1* | 8/2010 | Koito | .................. | G02F 1/13338 345/173 |
| 2010/0225609 A1* | 9/2010 | Huang | ................ | G02F 1/13338 345/173 |
| 2010/0328294 A1* | 12/2010 | Sasaki | .................. | G09G 3/3233 345/211 |
| 2011/0227851 A1* | 9/2011 | Oh | ....................... | G02F 1/13338 345/173 |
| 2011/0310059 A1* | 12/2011 | Miyamoto | ............ | G06F 3/0412 345/174 |
| 2012/0081333 A1* | 4/2012 | Ozeki | ..................... | G06F 3/044 345/174 |

(Continued)

*Primary Examiner* — Thuy Pardo
(74) *Attorney, Agent, or Firm* — WPAT, PC

(57) ABSTRACT

An in-cell touch display panel includes a substrate, a semiconductor stack, a transparent layer, an insulation layer and a metal layer. The semiconductor stack is disposed on the substrate, and includes a plurality of pixel control elements. The transparent layer is disposed on the semiconductor stack, and includes a plurality of first touch electrode strips extending along a first direction. The insulation layer is disposed on the transparent layer. The metal layer is disposed on the insulation layer, and includes a plurality of second touch electrode strips extending along a second direction. The first touch electrode strips intersect and are insulated from the second touch electrode strips.

22 Claims, 20 Drawing Sheets

(56) References Cited

U.S. PATENT DOCUMENTS

| | | | | |
|---|---|---|---|---|
| 2013/0050126 A1* | 2/2013 | Kimura | ............... | G02F 1/13338 345/173 |
| 2013/0215057 A1* | 8/2013 | Kawachi | ................. | G06F 3/044 345/173 |
| 2014/0184560 A1* | 7/2014 | Adachi | ................. | G06F 3/0412 345/174 |
| 2014/0210743 A1* | 7/2014 | Kurasawa | ............... | G06F 3/041 345/173 |
| 2014/0253501 A1* | 9/2014 | Noguchi | ............ | G02F 1/13338 345/174 |
| 2014/0292710 A1* | 10/2014 | Koito | ...................... | G06F 3/044 345/174 |
| 2014/0333582 A1* | 11/2014 | Huo | .................... | G02F 1/13338 345/174 |
| 2015/0022494 A1* | 1/2015 | Azumi | .................. | G06F 3/0412 345/174 |
| 2015/0022501 A1* | 1/2015 | Kita | .................... | G02F 1/13338 345/174 |
| 2016/0004369 A1* | 1/2016 | Noguchi | ............ | G02F 1/13338 345/174 |
| 2016/0070395 A1* | 3/2016 | Hung | ..................... | G09G 5/003 345/173 |

\* cited by examiner

IN-CELL TOUCH DISPLAY PANEL

This application claims the benefit of U.S. Provisional Application Ser. No. 62/065,021, filed Oct. 17, 2014, and No. 62/068,005, filed Oct. 24, 2014, the subject matter of which is incorporated herein by reference.

BACKGROUND OF THE INVENTION

Field of the Invention

The invention relates in general to an in-cell touch display panel, and more particularly to a touch display panel that integrates a touch sensor in a display panel.

Description of the Related Art

As technologies continue to progress, touch panels featuring human-machine interactions are commonly applied as input interfaces at external ports of various apparatuses. In the recent years, with extensive developments and applications of consumer electronic products, the number of application products employing touch display devices integrated with touch control and display functions also continues to expand. Some examples of these application products include mobile phones, GPS navigation systems, tablet computers, personal digital assistants (PDAs), and laptop computers. A conventional touch display device is formed by directly attaching a touch panel to a display panel, and so the overall thickness and weight of the panels are greater than those of one single display panel, resulting in a burden in user portability. Therefore, there is a need for solution for reducing the thickness of a touch display panel.

SUMMARY OF THE INVENTION

It is a primary object of the present invention to provide an in-cell touch display panel. Without affecting the display function, the in-cell touch display panel realizes the touch function to increase element integration and lower production costs as well as to reduce the thickness and weight of the in-cell touch display panel at the same time.

To achieve the above object, the present invention provides an in-cell touch display panel. The inc-cell touch display panel includes a first substrate, a semiconductor stack, a transparent layer, an insulation layer and a metal layer. The semiconductor stack is disposed on the first substrate, and includes a plurality of pixel control elements. The transparent layer is disposed on the semiconductor layer, and includes a plurality of first touch electrode strips extending along a first direction. The insulation layer is disposed on the transparent layer. The metal layer is disposed on the insulation layer, and includes a plurality of second touch electrode strips extending along a second direction. The first touch electrode strips intersect and are insulated from the second touch electrode strips.

To achieve the above object, the present invention further provides an in-cell touch display panel having a transparent layer and a metal layer. The in-cell touch display panel includes a plurality of first display pixel units, a plurality of second display pixel units, and a plurality of third display pixel units. Each of the first display pixel units includes a first transparent segment disposed in the transparent layer, and a first metal segment disposed in the metal layer. Each of the second display pixel units includes a second transparent segment disposed in the transparent layer. The first transparent segments and the second transparent segments form a plurality of first touch electrode strips that extend along a first direction. Each of the third display pixel units includes a second metal segment disposed in the metal layer. The first metal segments and the second metal segments form a plurality of second touch electrode strips that extend along a second direction. The first touch electrode strips intersect and are insulated from the second touch electrode strips.

In the in-cell touch display panel of the present invention, a touch sensor may be disposed in the display panel without attaching an additional touch panel on the display panel. Further, the first touch electrode strips and the second touch electrode strips may be formed by the first transparent layer and the first metal layer, respectively, and need not be formed through connections by through holes, thereby reducing complications of the manufacturing process. Further, when display electrodes are a common electrode, the display electrodes may electrically connect to the same common electrode through an electrical connection of first connecting lines formed by the first metal layer, thereby preventing the in-cell touch display panel from displaying unsatisfactory images.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
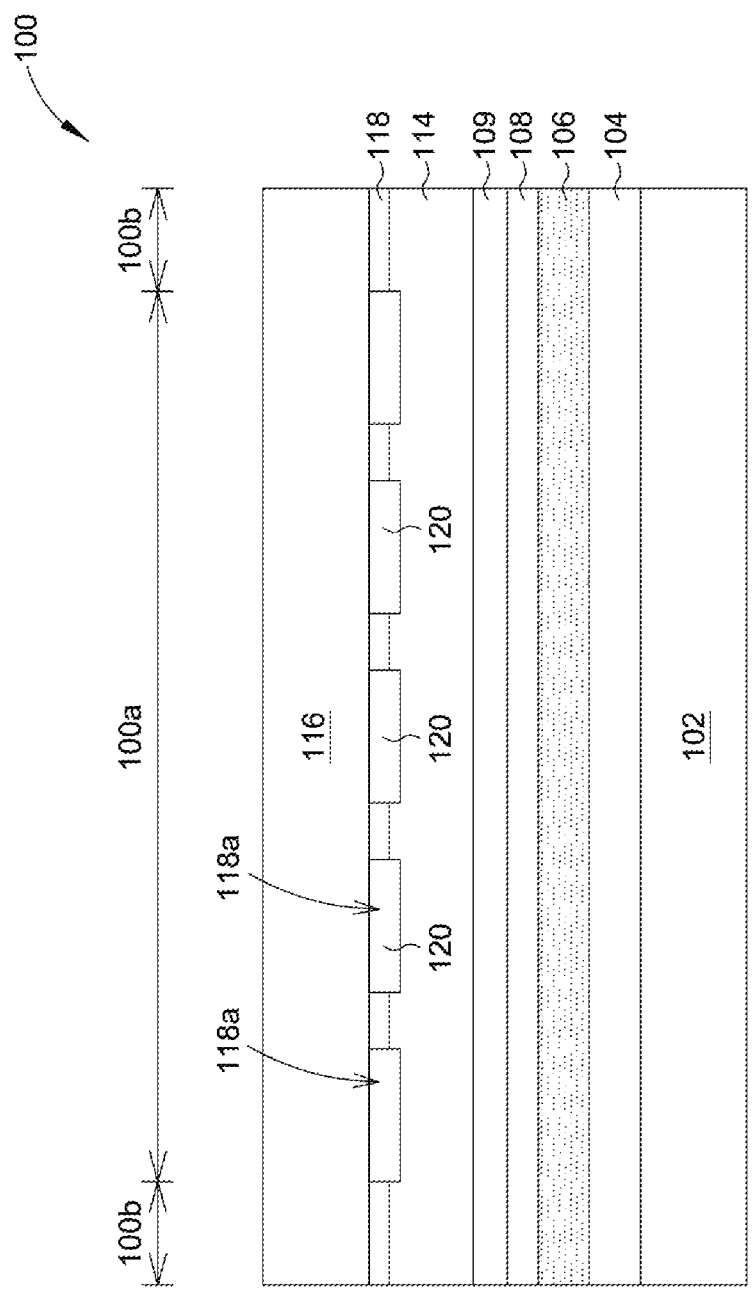
FIG. 1 is a section view of an in-cell touch display panel of the present invention.

Referring to FIG. 1, an in-cell touch display panel 100 according to an embodiment includes an active region 100a and a border region 110b. Elements for image display and touch functions are allocated in the active region 100a. The border region 100b may surround the active region 100a, and is for allocating circuits or control elements not to be seen by a user, such as peripheral circuits or driving elements, for example. The in-cell touch display panel 100 may include a first substrate 102, a semiconductor stack 104, a first transparent layer 106, a first insulation layer 108 and a first metal layer 109. The semiconductor stack 104 is disposed on the first substrate 102, includes a plurality of pixel control elements, and is utilized for transmitting image signals to be displayed by the in-cell touch display panel 100. The first transparent layer 106 is disposed on the semiconductor stack 104. The first insulation layer 108 is disposed on the first transparent layer 106. The first metal layer 109 is disposed on the first insulation layer 108. The first transparent layer 106 and the first metal layer 109 are electrically insulated via the first insulation layer 108, and may form capacitance coupling with each other to form a touch sensor. For example, the first transparent layer 106 may include a driving electrode, which is disposed in the active region 100a and utilized for transmitting a touch driving signal; the first metal layer 109 may include a sensing electrode, which is disposed in the active region 100a and utilized for sensing the coupling capacitance change. As such, the touch sensor is allowed to detect an approach of a touching object or a position of a touching object touching the in-cell touch display panel 100. In another embodiment, the driving electrode and the sensing electrode may be formed via the first metal layer 109 and the first transparent layer 106, respectively.

In the embodiment, the in-cell touch display panel 100 may be a liquid crystal display (LCD) panel, and may further include a liquid crystal layer 114 and a second substrate 116. The first substrate 102 and the second substrate 116 are disposed opposite each other, and the liquid crystal layer 114 is disposed between the first substrate 102 and the second substrate 116. As the semiconductor stack 104, the first transparent layer 106, the first insulation layer 108 and the first metal layer 109 are disposed between the first substrate 102 and the liquid crystal layer 114, the in-cell touch display panel 100 of the embodiment is capable of integrating the touch sensor therein to provide the in-cell touch display panel 100 with a touch function. The in-cell touch display panel 100 of the present invention is not limited to an LCD panel, and the display panel integrated with the touch sensor of the present invention may be another type of active array display panel, e.g., an organic light emitting diode (OLED) display panel.

The in-cell touch display panel 100 may further include a black matrix 118 and a plurality of color filter plates 120. The black matrix 118 and the color filter plates 120 are disposed on a surface of the second substrate 116 facing the liquid crystal layer 114. The black matrix 118 includes a plurality of openings 118a located in the active region 100a. Each of the openings 118a corresponds to a pixel region of the in-cell touch display panel 100, such that a light passing through each of the openings 118a may form a pixel or a sub-pixel of an image. The black matrix 118 may be utilized to shield elements or circuits not be seen by a user. The color filter plates 120 are disposed on the second substrate 116 in the openings 118a, and are utilized for determining a color of a light emitted from the pixel regions. It should be noted that, the first metal layer 109 forming a part of the touch sensor may be shielded by the black matrix 118 to remain unobserved by a user, so as to prevent the first metal layer 109 from limiting an area through which the light passes through the pixel regions, i.e., to prevent the first metal layer 109 from limiting an aperture ratio of the pixels.

Figure 2:
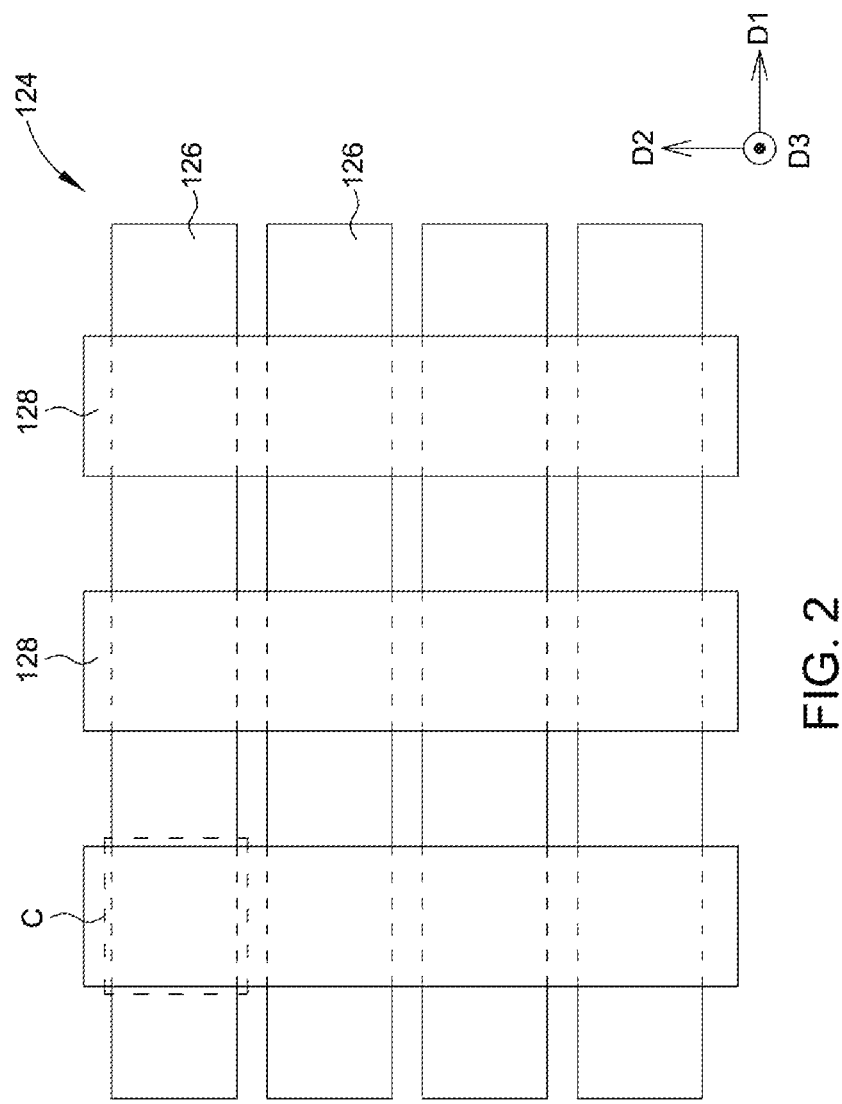
FIG. 2 is a top view of a touch sensor of the present invention.

Details of the touch sensor of the embodiment are given below. Referring to FIG. 2, a touch sensor 124 of the embodiment may be disposed in the active region 100a, so that a position of a touching object touching or approaching the in-cell touch display panel 100 in the active region 100a can be detected by the touch sensor 124. The touch sensor 124 is formed by a plurality of first touch electrode strips 126 and a plurality of second touch electrode strips 128 that intersect one another. The first touch electrode strips 126 extend along a first direction D1, and the second touch electrode strips 128 extend along a second direction D2 different from the first direction D1. The first touch electrode strips 126 intersect and are insulated from the second touch electrode strips 128, such that a mutual capacitor C is generated at an intersection of each of the first touch electrode strips 126 and each of the second touch electrode strips 128. In the embodiment, the touch sensor 124 may be driven by a mutual touch sensing method. For example, a touch driving signal may be transmitted to the first touch electrode strips 126, and the second touch electrode strips 128 may sense the touch driving signal through the mutual capacitors C to generate a touch sensing signal. When a touching object approaches or touches the in-cell touch display panel 100, the mutual capacitor C corresponding to the touching object is changed, and so the position of the touching object can be accordingly detected. In the present invention, the first touch electrode strips 126 and the second touch electrode strips 128 may be formed by the first transparent layer 106 and the first metal layer 109, respectively, or vice versa.

Further, the first touch electrode strips 126 and the second touch electrode strips 128 may be utilized to transmit the touch driving signal and the touch sensing signal in an individually sequential or grouped sequential manner. That is, the touch driving signal and the touch sensing signal may be transmitted in a unit of one single first touch electrode strip 126 or in a unit of a group of first touch electrode strips 126. At this point, by coupling with the first touch electrode strips 126, one single second electrode strip 128 or one group of second electrode strips 128 may sense the change in the touch driving signal to further generate the touch sensing signal. In another embodiment, the touch driving signal may also be transmitted by the second touch electrode strips 128, and the touch sensing signal is correspondingly generated by the first touch electrode strips 126.

Figure 3:
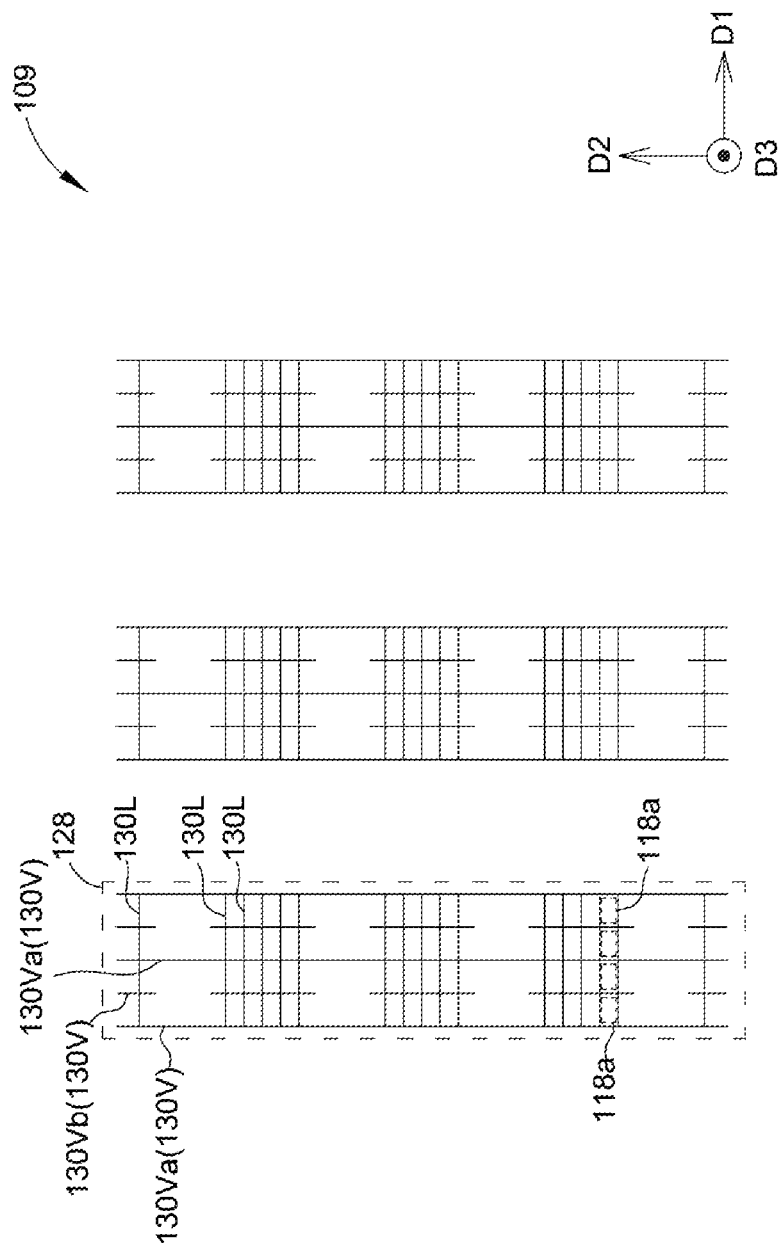
FIG. 3 is a top view of second touch electrode strips according to a first embodiment of the present invention.

Referring to FIG. 3, the first metal layer 109 may include the second touch electrode strips 128. In the embodiment, the second touch electrode strips 128 are arranged in a grid arrangement. Each of the second touch electrode strips 128 may include a plurality of vertical metal lines 130V extending along the second direction D2 and a plurality of horizontal metal lines 130L extending along the first direction D1. The vertical metal lines 130V may be divided into a plurality of first vertical metal lines 130Va and a plurality of second vertical metal lines 130Vb. The first vertical metal lines 130Va intersect and connect with the horizontal metal lines 130L, and the second vertical metal lines 130Vb interest and connect with only a part of the horizontal metal lines 130L. It should be noted that, in the third direction D3 perpendicular to the first substrate 102, the second touch electrode strips 128 do not overlap with the openings 118a of the black matrix 118, i.e., the second touch electrode strips 128 do not overlap with the pixel regions that display the image. That is to say, in the third direction D3, the black matrix 118 shields the second touch electrode strips 128 of the first metal layer 109, leaving the aperture ratio of the pixels unaffected even in the presence of the second touch electrode strips 128. Further, a gap between any two adjacent vertical metal lines 130V may be greater than or equal to a width of each of the openings 118a in the first direction D1, i.e., any two adjacent vertical metal lines 130V and any adjacent horizontal metal lines 130L may surround at least one pixel region. In another embodiment, the second touch electrode strips 128 may not be in a grid arrangement, and exclude the horizontal metal lines extending along the first direction. That is to say, the second touch electrode strips 128 may include only the plurality of first metal lines extending along the second direction. Further, the first metal lines 130Va of the second touch electrode strips 128 may electrically connect to one another via different connecting strips to serve as the same second touch electrode strip 128. For example, the first metal layer 109 may further include a plurality of connecting strips, which are disposed in the border region and extend along a direction different from the second direction, e.g., extending along the first direction. Alternatively, the connecting strips may be formed by a conductive layer other than the first metal layer.

Figure 4:
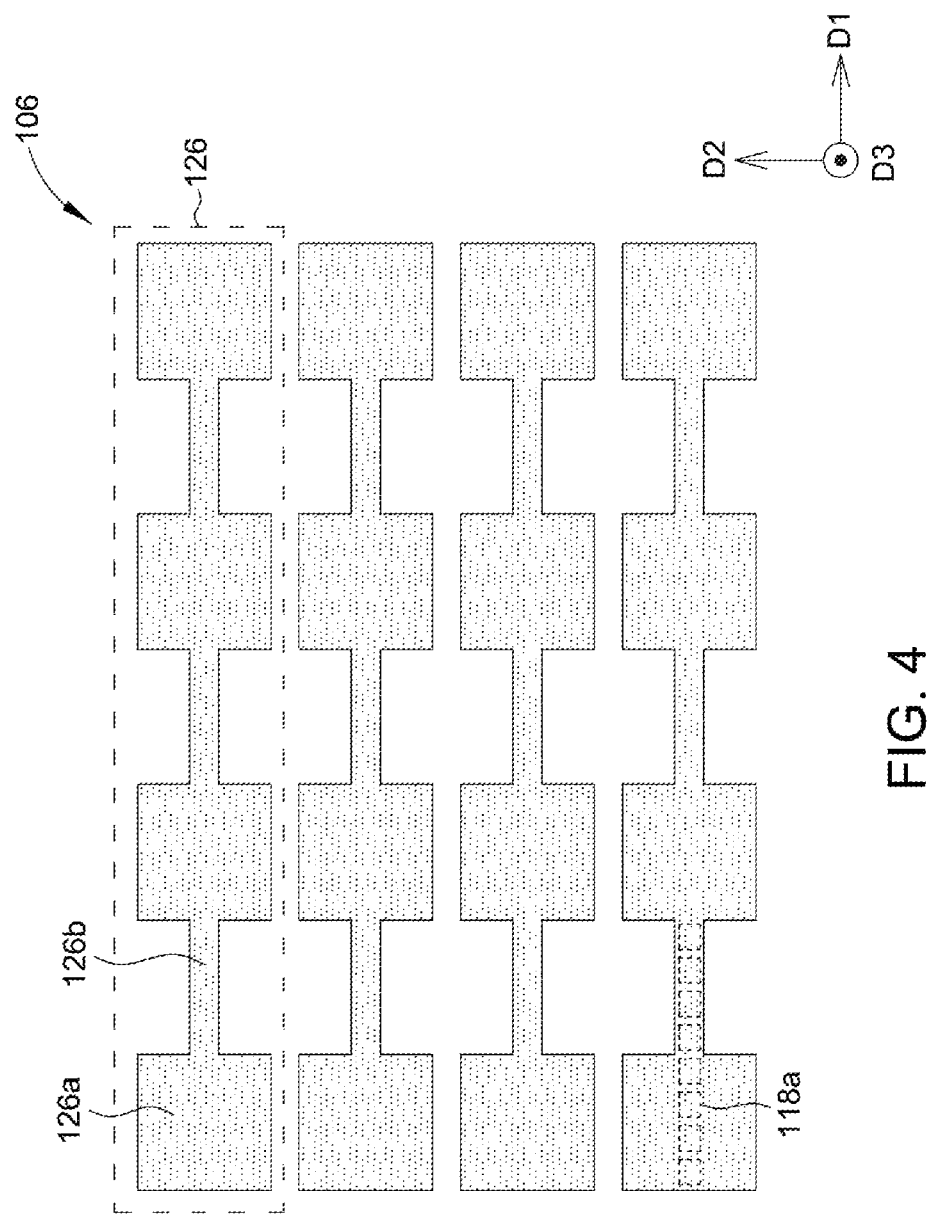
FIG. 4 is a top view of first touch electrode strips according to the first embodiment of the present invention.
Figure 5:
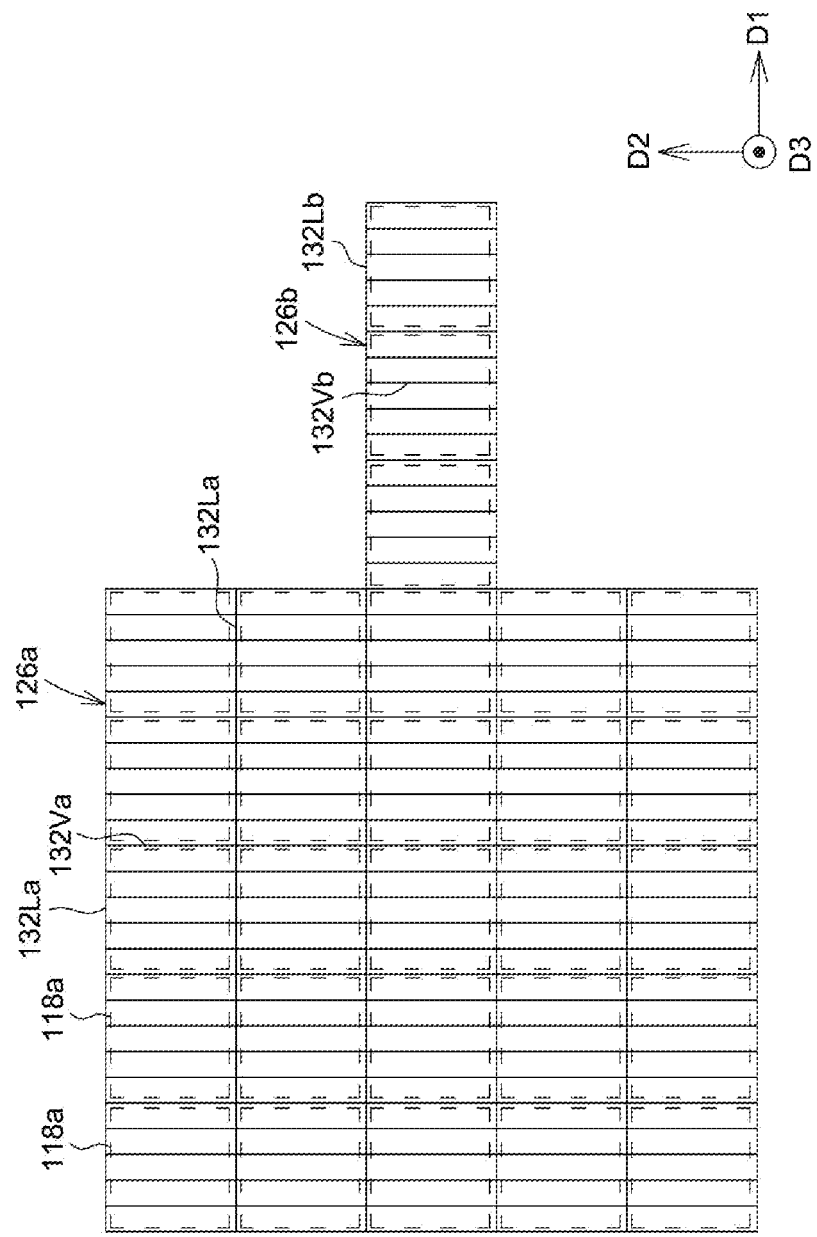
FIG. 5 is a top view of electrode portions and connecting portions according to the first embodiment of the present invention.

Referring to FIG. 4, in the embodiment, the first transparent layer 106 may include the first touch electrode strips 126. Each of the first touch electrode strips 126 includes a plurality of electrode portions 126a and a plurality of connecting portions 126b. The electrode portions 126a may be in a matrix arrangement, and the connecting portions 126b extend along the first direction D1 and each connects any two adjacent electrode portions 126a. Further, a width of the connecting portions 126b in the second direction D2 is smaller than a width of the electrode portions 126a in the second direction D2. Referring to FIG. 5, each of the electrode portions 126a may include a plurality of first vertical transparent lines 132Va extending along the second direction D2 and a plurality of first horizontal transparent lines 132La extending along the first direction D1. The first vertical transparent lines 132Va intersect and connect with the first horizontal transparent lines 132La. Each of the connecting portions 126b may include a plurality of second vertical transparent lines 132Vb extending along the second direction D2 and a plurality of second horizontal transparent lines 132Lb extending along the first direction D1. The second vertical transparent lines 132Vb intersect and connect with the second horizontal transparent lines 132Lb. The second horizontal transparent lines 132Lb and a part of the second vertical transparent lines 132Vb are covered by the black matrix 118 in the third direction D3, and another part of the second vertical transparent lines 132Vb cross the openings 118a of the black matrix 118 corresponding to the connecting portions 126b. A gap between any two adjacent first vertical transparent lines 132Va may be smaller than the width of each of the openings 118a in the first direction D1, and at least one of the first vertical transparent lines 132Va and at least one of the second vertical transparent lines 132Vb may cross the openings 118a. It should be noted that, in FIG. 4, each of the first electrode portions 126a includes a width of four openings 118a in the first direction, and each of the connecting portions 126b includes a width of four openings 118a in the first direction D1. In FIG. 5, each of the electrode portions 126a at least includes a width of five openings 118a in the first direction D1, and each of the connecting portions 126b at least includes a width of three openings 118a in the first direction D1. However, the width ratios of the electrode portions 126a, the connecting portions 126b and the openings 118a are not limited to the above exemplary values, and may be correspondingly adjusted according actual requirements. For example, being adjustable according to actual requirements, each of the electrode portions 126a may include a width of 30 openings 118a in the first direction D1, and each of the connecting portions 126b may include a width of 50 openings 118a in the first direction D1. Similarly, the widths of the electrode portions 126a and the connecting portions 126b in the second direction D2 are not limited to the above exemplary values, and may be correspondingly adjusted according actual requirements. To clearly illustrate associated features in the drawings below, appropriate width ratios are depicted are not repeatedly described in these drawings.

It should be noted that, the first touch electrode strips 126 of the embodiment may serve not only as a part of the touch sensor 124 but also as a common electrode. More specifically, the first touch electrode strips 126 of the embodiment may be utilized to transmit touch driving signals in a touch control period, and to transmit a common voltage in a display period that is non-overlapping with the touch control period to serve as a common electrode.

Figure 6:
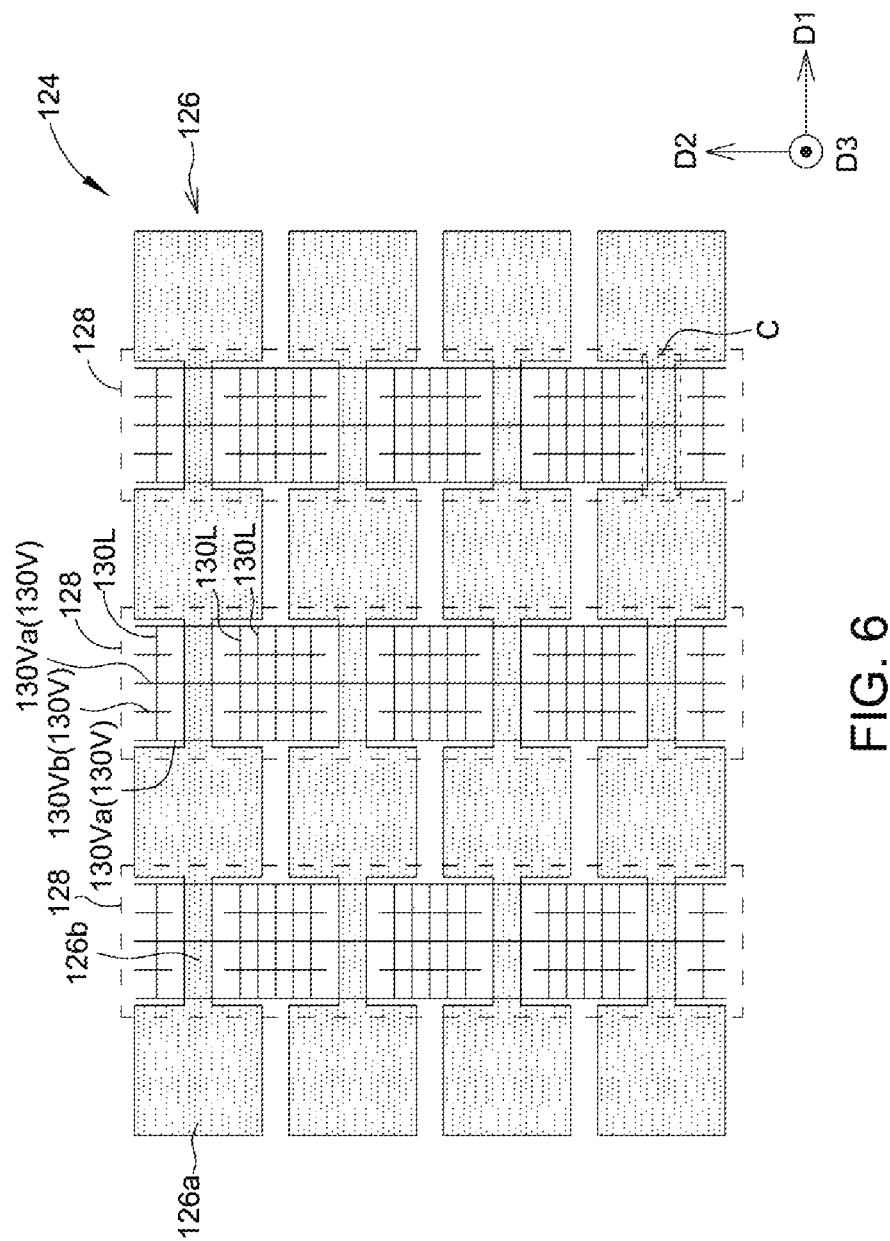
FIG. 6 is a top view of a touch sensor according to the first embodiment of the present invention.

Referring to FIG. 6, in the touch sensor 124 of the embodiment, the second touch electrode strips 128 are disposed between any two adjacent electrode portions 126a disposed along the first direction D1 to further intersect the connecting portions 126b of the first touch electrode portions 126. Each of the connecting portions 126b is disposed correspondingly to and is opposite one of the second touch electrode strips 128, and overlaps with and is insulated from that second touch electrode strip 128 in the third direction D3. As such, each of the second touch electrode strips 128 may form a capacitor C with each of the connecting portions 126b at an intersection of the two.

Figure 7:
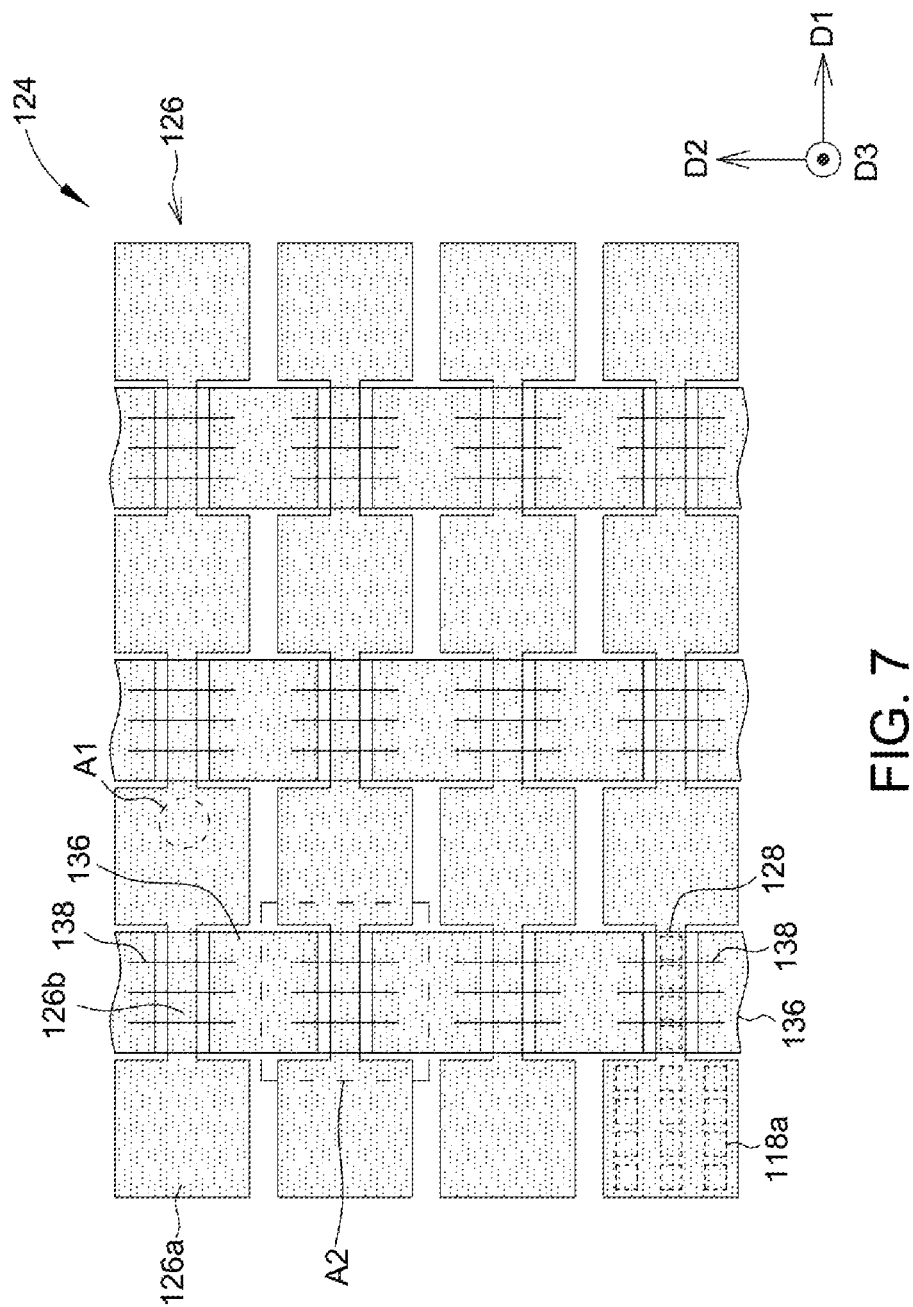
FIG. 7 is a top view of a first transparent layer and a first metal layer according to the first embodiment of the present invention.

Referring to FIG. 7, the first transparent layer 106 may further include a plurality of display electrodes 136 disposed in the active region 100a. The display electrodes 136 do not connect with the first touch electrode strips 126, and are insulated from the first touch electrode strips 126. More specifically, the display electrodes 136 may be in a matrix arrangement, and each of the display electrodes 136 is disposed between any two adjacent first touch electrode strips 126, such that the display electrodes 136 are insulated from one another by the first touch electrode strips 126. As each of the second touch electrode strips 128 is disposed between any two adjacent electrode portions 126a along the first direction D1, the display electrodes 136 disposed along the second direction D2 overlap with at least one of the second touch electrode strips 128 in the third direction D3.

In the embodiment, the display electrodes 136 may serve as a common electrode, and the first metal layer 109 may further selectively include a plurality of first connecting lines 138 extending along the second direction D2. The first connecting lines 138 are insulated from the second touch electrode strips 128, and electrically connect to at least two of the display electrodes 136 disposed along the second direction D2. In other words, the display electrodes 136 of the same column may electrically connect to one another via at least one of first connecting lines 138, so as to allow the display electrodes 136 serving as a common electrode to electrically connect to a same common voltage in the display period. As such, the display electrodes 136 are not kept floating in the display period to further prevent the in-cell touch display panel 100 from displaying unsatisfactory images. The length of the first connecting lines 138 in the second direction D2 and the number of the first connecting lines 138 that electrically connect any two display electrodes 136 may be determined according to actual designs.

Further, the first connecting lines 138 may cross only one single connecting portion 126b, and thus only overlaps and electrically connects to any two adjacent display electrodes 136 disposed along the second direction D2. As such, the display electrodes 136 disposed along the second direction D2 and at two sides of each of the connecting portions 126b may electrically connect to one another via the first connecting lines 138, and may further electrically connect to circuit components at the border region 100b, e.g., control elements. In the embodiment, for example, the number of the first connecting lines 138 connecting any two adjacent display electrodes 136 disposed along the second direction D2 is plural, or may be at least one. In another embodiment, the connecting lines may cross at least two connecting portions, and overlap with at least three display electrodes disposed along the second direction. Further, the connecting lines may electrically connect at least three display electrodes disposed along the second direction or at least two adjacent or at least two non-adjacent of these three display electrodes. In another embodiment, the first connecting lines 138 may also extend along the first direction D1 to electrically connect at least two of the display electrodes 136 disposed along the first direction D1, and are insulated from the second touch electrode strips 128.

Figure 8:
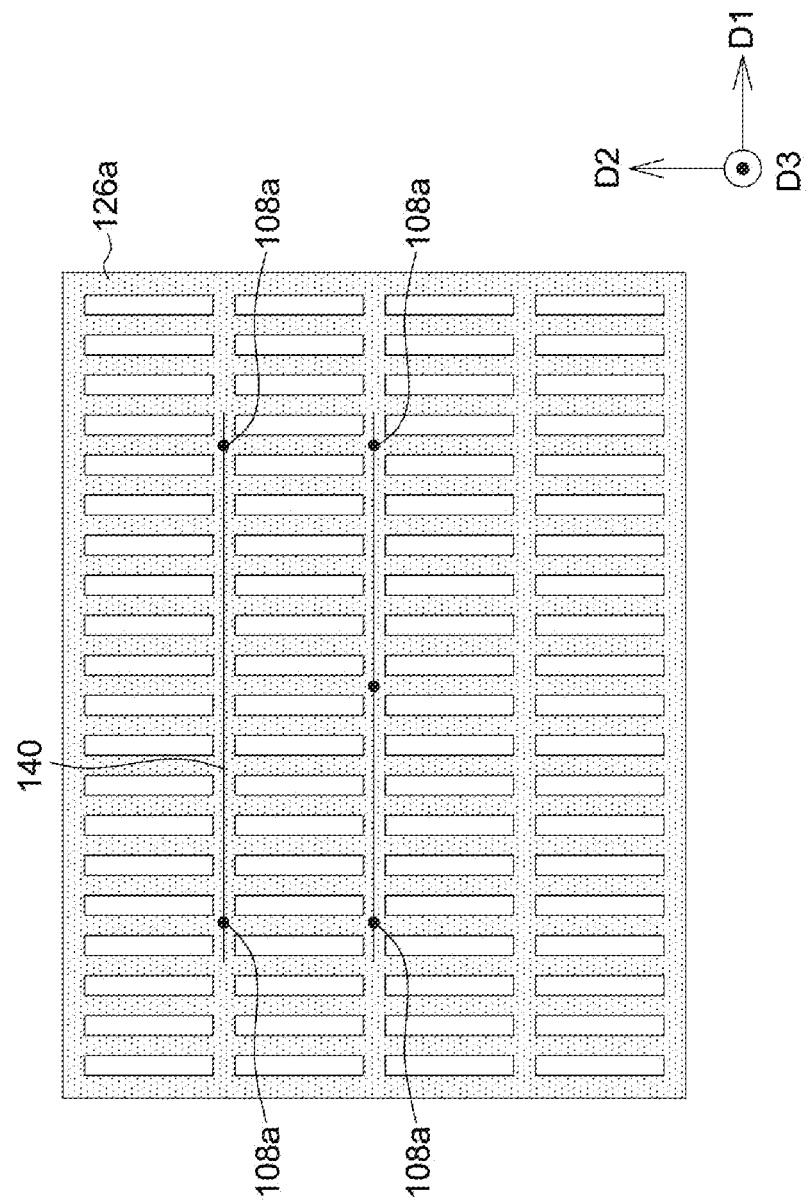
FIG. 8 is an enlarged view of a region A1 in FIG. 7.

Referring to FIG. 8, the first metal layer 109 may further include a plurality of second connecting lines 140, which may overlap and electrically connect with at least one of the electrode portions 126a in the third direction D3. More specifically, the first insulation layer 108 may include a plurality of second through holes 108a, and at least two parts of each of the second connecting lines 140 may electrically connect to one electrode portion 126a via at least two of the second through holes 108a. As the second connecting lines 140 are formed by metal, the second connecting lines 140 have a resistance value smaller than that of the electrode portion 126a formed by a transparent material. Thus, by electrically connecting to one electrode portion 126a via the second connecting lines 140, the resistance value of the electrode portion 126a can be effectively reduced. In the embodiment, for example, the second connecting lines 140 extend along the first direction D1. In another embodiment, the second connecting lines may extend along the second direction D2.

Figure 10:
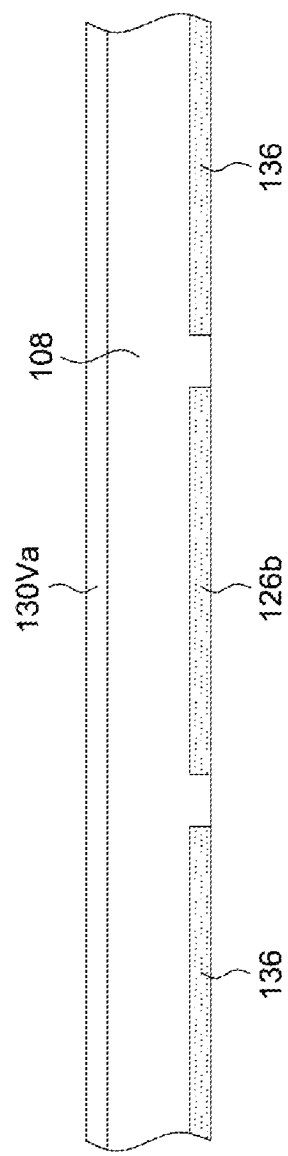
FIG. 10 is a section view of FIG. 9 along a section line A-A'.
Figure 11:
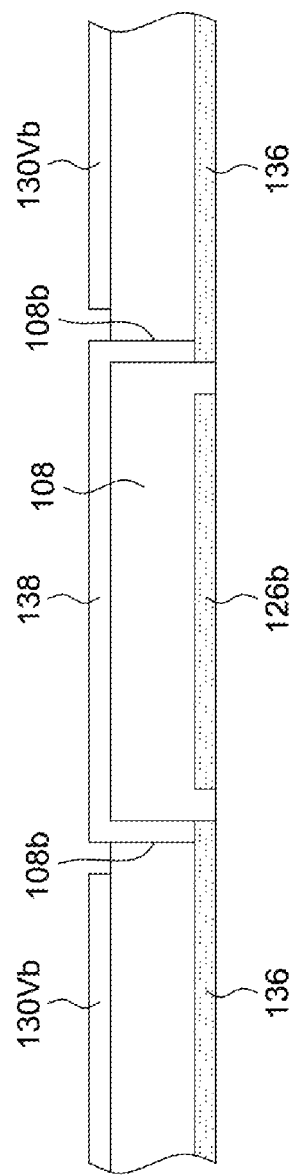
FIG. 11 is a section view of FIG. 9 along a section line B-B'.

Configuration relationships of the first touch electrode strips 126, the first connecting lines 138 and the second touch electrode strips 128 are further described with reference to FIG. 9 to FIG. 11. Although the first connecting lines 138 and the second touch electrode strips 128 are both formed by the first metal layer 109, the first connecting lines 138 are insulated from the second touch electrode strips 128, and the two are shielded by the black matrix 118. To insulate the first connecting lines 138 from the second touch electrode strips 128, the first connecting lines 138 are not in contact with the second touch electrode strips 128 and are disposed with a gap in between from the second touch electrode strips 128. Thus, a part of the first metal layer 109 right above the connecting portions 126b may form the first connecting lines 138, and another part of the metal layer 109 may still form the first vertical metal lines 130Va of the second touch electrode strips 128, such that the second touch electrode strips 128 may cross the connecting portions 126b via the first vertical metal lines 130Va. Further, the first insulation layer 108 may include a plurality of first through holes 108b, so as to allow at least one of the first connecting lines 138 to electrically connect to at least two of the display electrodes 136 disposed along the second direction D2 via at least two of the first through holes 108b.

Figure 9:
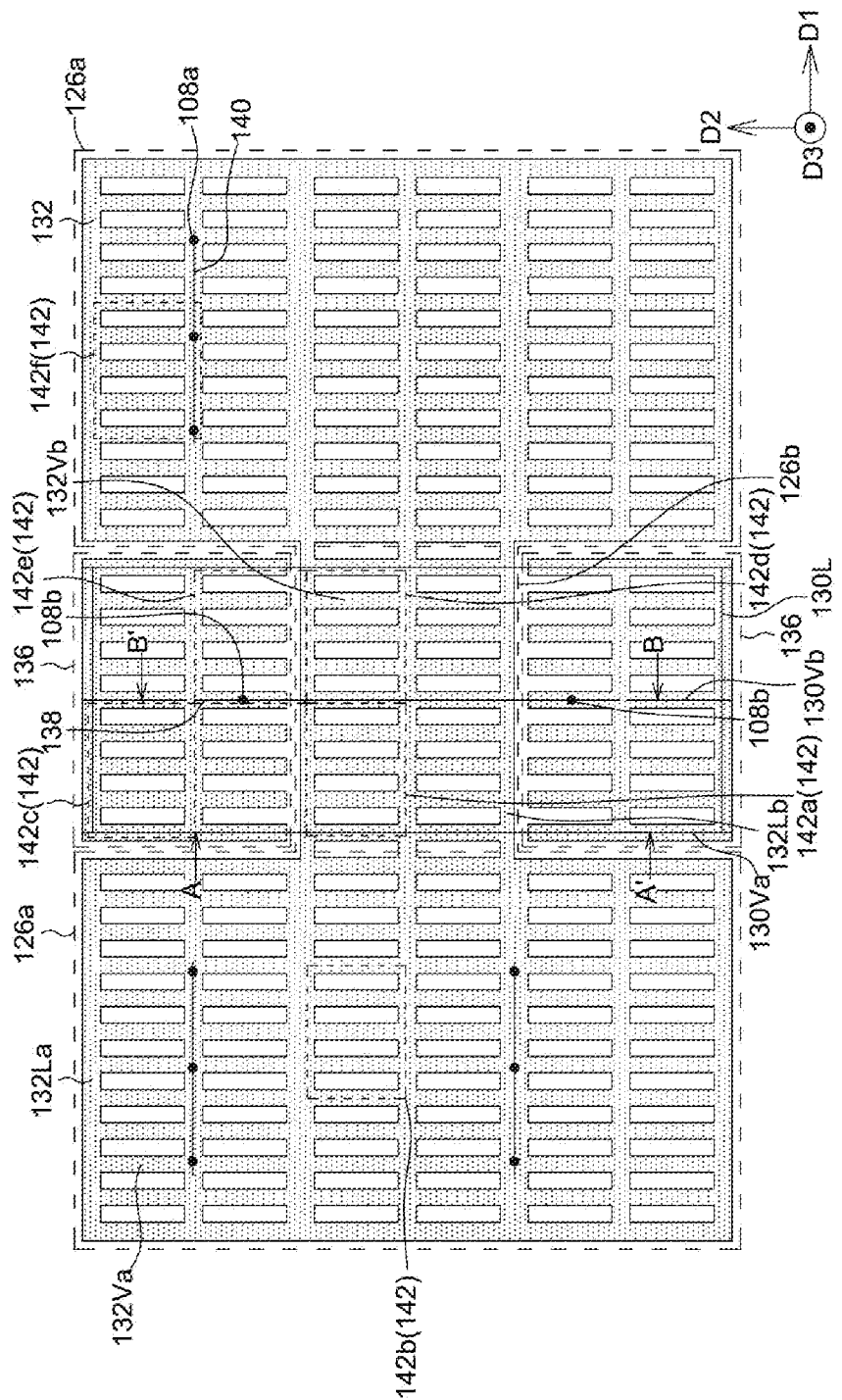
FIG. 9 is an enlarged view of a region A2 in FIG. 7.
Figure 12:
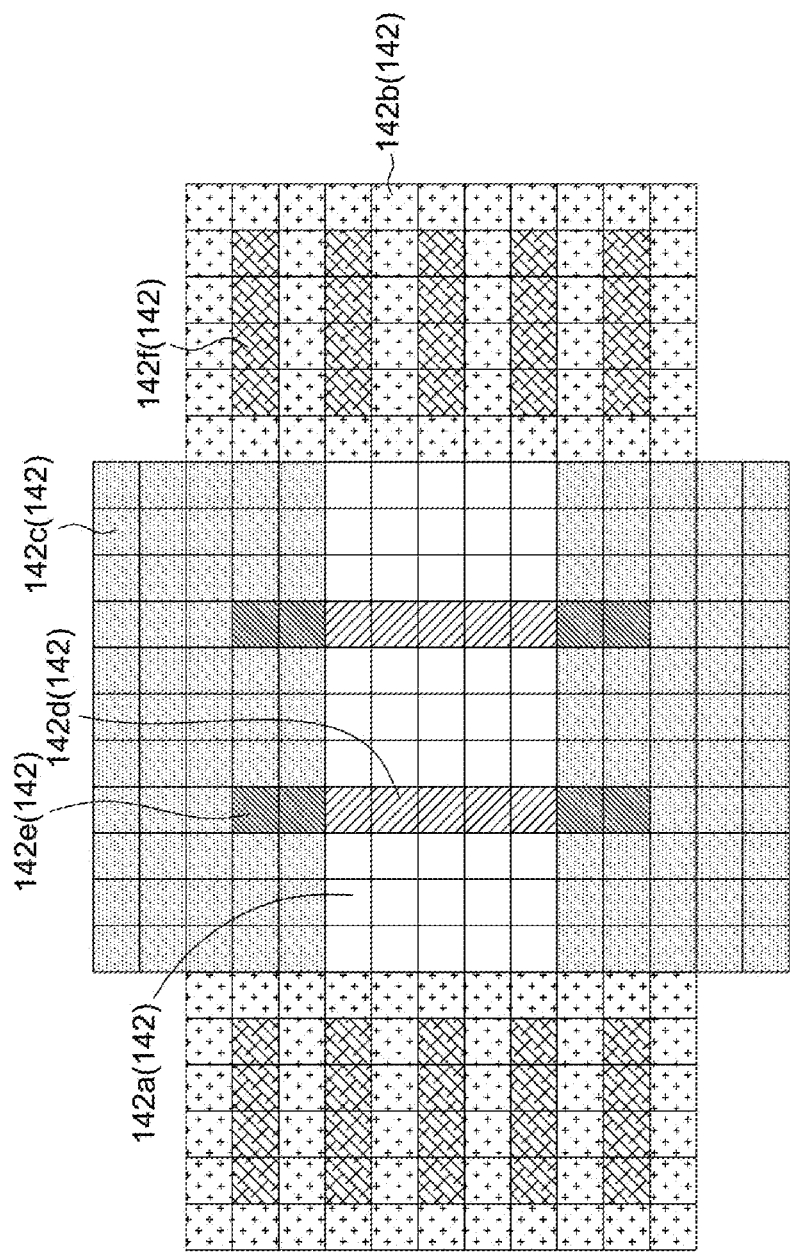
FIG. 12 is a top view of display pixel units according to the first embodiment of the present invention.

Referring to FIG. 12 as well as FIG. 9, in the embodiment, the in-cell touch display panel 100 may include a plurality of display pixel units 142. For example, each of the display pixel units 142 corresponds to a structure that the in-cell touch display panel 100 utilizes to display one single color of a display image. The display pixel units 142 may include a plurality of first display pixel units 142a, a plurality of second display pixel units 142b and a plurality of third display pixel units 142c. The display pixel units located at different regions have different structures, which are described below with the accompanying drawings, respectively.

Figure 13:
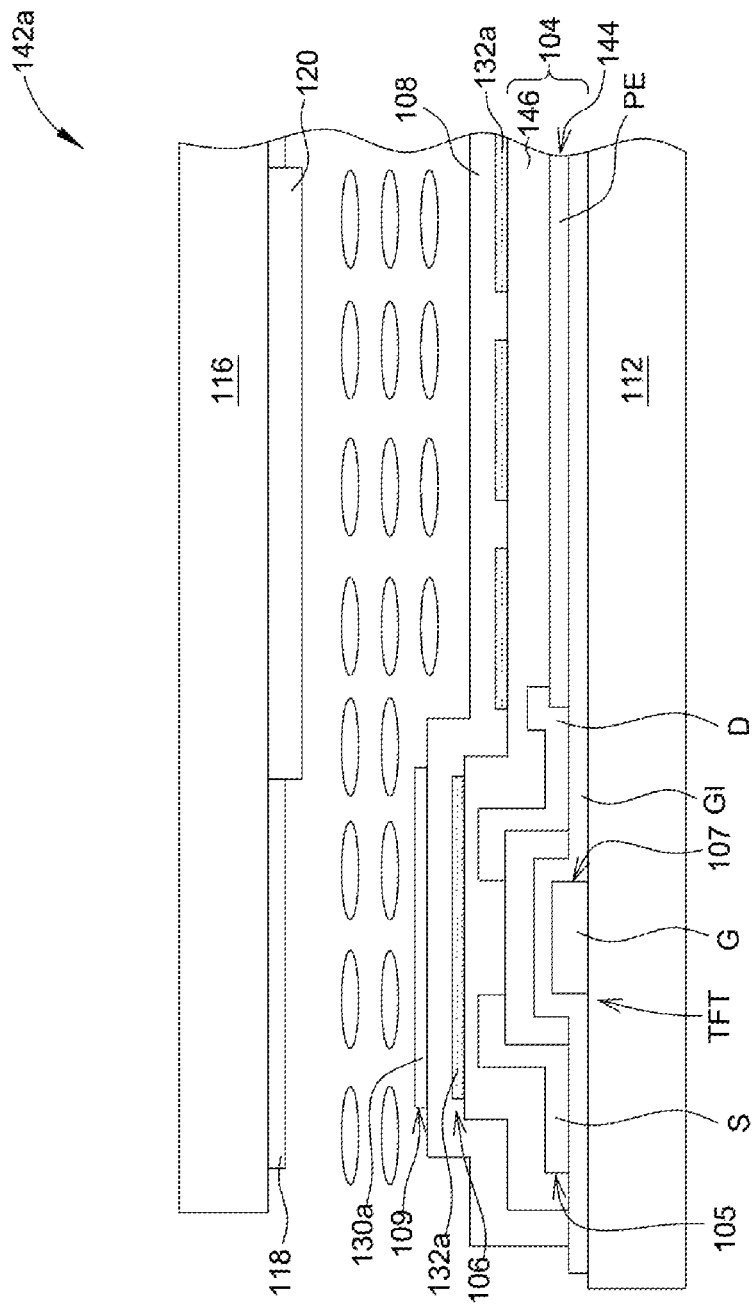
FIG. 13 is a section view of a first display pixel unit according to the first embodiment of the present invention.

Referring to FIG. 13 as well as FIG. 9 and FIG. 12, the first display pixel units 142a correspond to regions where the second touch electrode strips 128 cross the connecting portions 126b, and may include the first transparent layer 106 and the first metal layer 109. More specifically, in each of the first display pixel units 142, the first transparent layer 106 may include a plurality of first transparent segments 132a, and the first metal layer 109 may include a first metal segment 130a. The first transparent segments 132a are insulated from the first metal segment 130a. The first transparent segments 132a of a plurality of first display pixel units 142a corresponding to the same connecting portion 126b are electrically connected to one another.

In addition to the first transparent layer 106 and the first metal layer 109, each of the display pixel units 142a may further include the semiconductor stack 104. The semiconductor stack 104 of each of the first display pixel units 142a may include a pixel control element. The pixel control element may include a thin-film transistor TFT, a gate (not shown), a data line (not shown), a second transparent layer 144 and a second insulation layer 146. Each of the thin-film transistors TFT is disposed adjacently to an intersection of the gate line and the data line, and includes a gate G, a gate insulation layer GI, a source S and a drain D. The gate G is connected to the gate line. In the embodiment, the gate G and the gate line may be formed by the second metal layer 107. The gate insulation layer GI covers the second metal layer 107 and the first substrate 102. The source S is electrically connected to the data line. For example, the source S, the drain D and the data line may be formed by the third metal layer 105. The type of TFT of the present invention is not limited to the above example, and may be other types, e.g., a top low-temperature polysilicon gate (LTPS) TFT. In the embodiment, the second transparent layer 114 of each of the first display pixel units 144a includes a pixel electrode PE electrically connected to the drain D of the thin-film transistor TFT. The second insulation layer 146 covers the third metal layer 105, the pixel electrode PE and the gate insulation layer GI. Thus, the pixel electrodes PE may be insulated from the first transparent segments 132a of the first transparent layer 106 via the second insulation layer 146. When the in-cell touch display panel 100 performs a display function, a voltage difference between the pixel electrode PE and the first transparent segment 132a located thereon may form an in-phase electric field. It should be noted that, the semiconductor stack 104 of the present invention is not limited to the above structure, and may be correspondingly adjusted according to actual requirements. For example, the pixel electrode may further include a slit disposed correspondingly to the second transparent segment. Alternatively, the second transparent layer may include a common electrode, and the first transparent segment of each of the first display pixel units may serve as a pixel electrode electrically connected to the drain of the thin-film transistor. At this point, the first transparent segments of different first display pixel units are insulated from one another.

Figure 14:
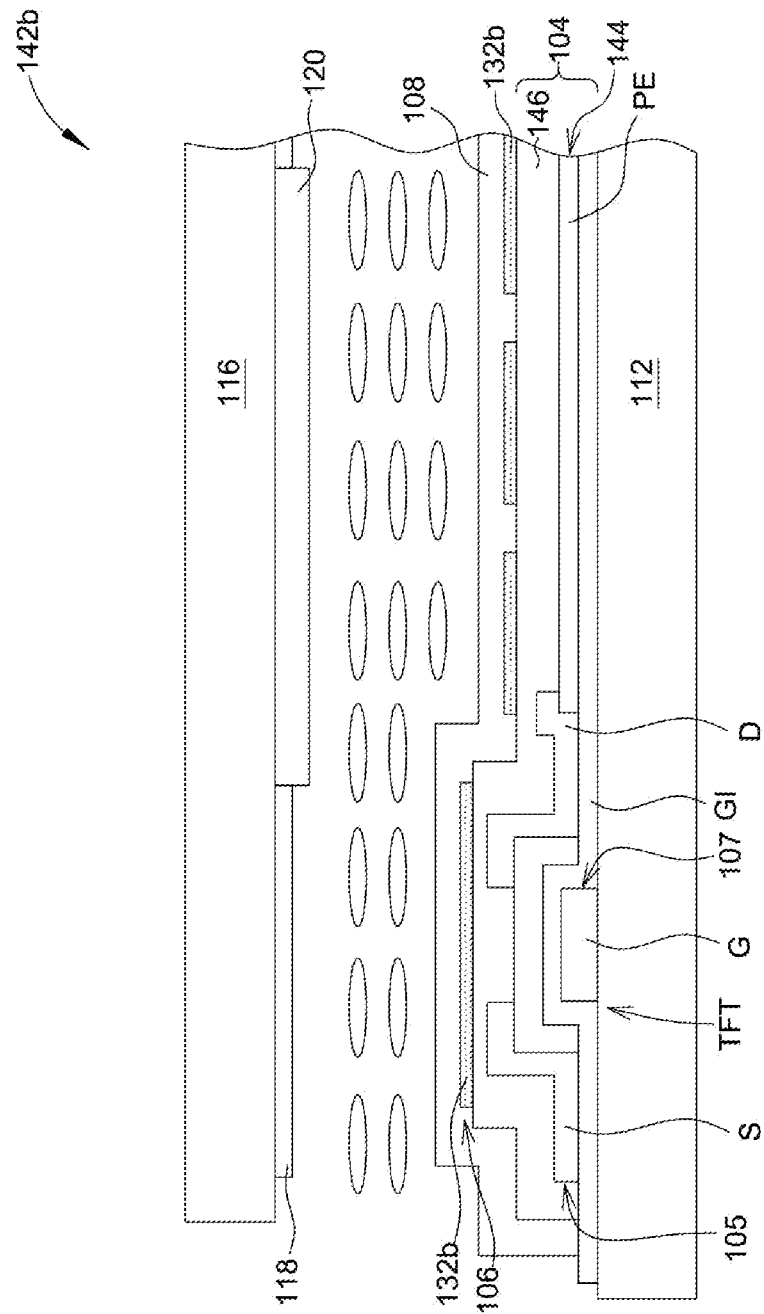
FIG. 14 is a section view of a second display pixel unit according to the first embodiment of the present invention.

Referring to FIG. 14 as well as FIG. 9 and FIG. 12, the second display pixel units 142b correspond to regions of the electrode portions 126a, with these regions excluding the second connecting lines 140. Thus, compared to the first display pixel units 142a, each of the second display pixel units 142b does not include the first metal layer 109 and includes the first transparent layer 106. More specifically, in each of the second display pixel units 142b, the first transparent layer 106 may include a plurality of second transparent segments 132b, and the second transparent segments 132b of the second display pixel units 142b corresponding to the electrode portions 126a are electrically connected to one another. The second transparent segments 132b of the second display pixel units 142b form a plurality of electrode portions 126a, and the first transparent segments 132a and the second transparent segments 132b form a plurality of first touch electrode strips 126.

Figure 15:
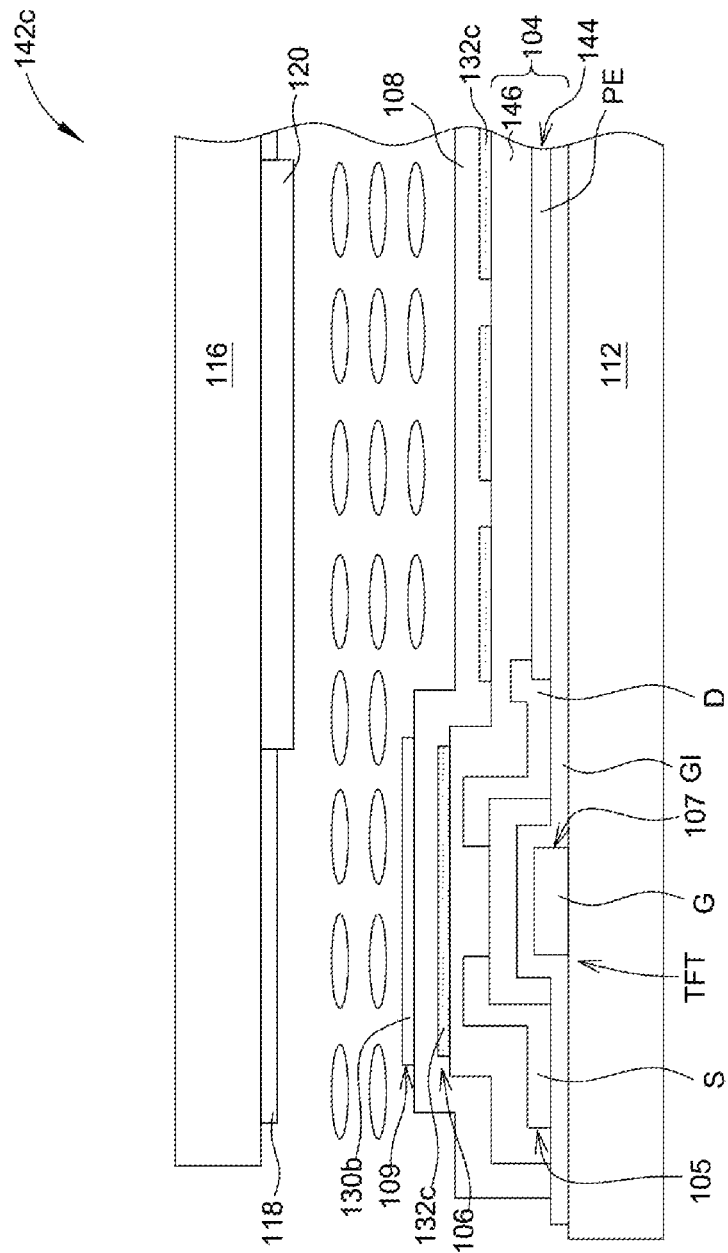
FIG. 15 is a section view of a third display pixel unit according to the first embodiment of the present invention.

Referring to FIG. 15 as well as FIG. 9 and FIG. 12, the third display pixel units 142c correspond to regions where the second touch electrode strips 128 overlap with the display electrodes 136. Each of the third display pixel units 142c includes the first metal layer 109. More specifically, in each of the third display pixel units 142c, the first metal layer 109 includes a second metal segment 130b, and the second metal segments 130b and the first metal segments 130a corresponding to the same second touch electrode strip 128 are electrically connected to one another to form that second touch electrode strip 128.

Each of the third display pixel units 142c further includes the first transparent layer 106. More specifically, the first transparent layer 106 of each of the third display pixel units 142c includes a plurality of third transparent segments 132c, and is insulated from the first transparent segments 132a and the second transparent segments 132b.

Figure 16:
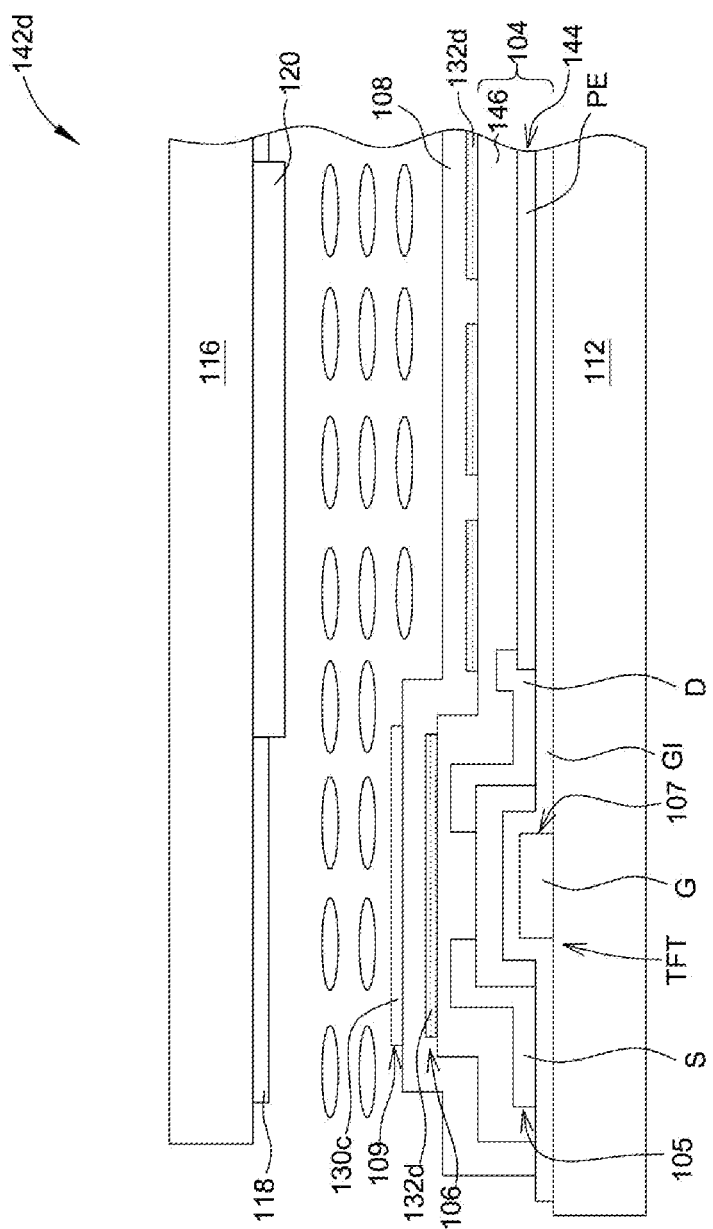
FIG. 16 is a section view of a fourth display pixel unit according to the first embodiment of the present invention.

Referring to FIG. 16 as well as FIG. 9 and FIG. 12, the display pixel units 142 may further include a plurality of fourth display pixel units 142d. The fourth display pixel units 142d correspond to regions where the first connecting lines 138 intersect the connecting portions 126b. Each of the fourth display pixel units 142d may include the first transparent layer 106 and the first metal layer 109. More specifically, in each of the display pixel units 142d, the first transparent layer 106 may include a plurality of fourth transparent segments 132d, and the fourth transparent segments 132d and the first transparent segments 132a corresponding to the same connecting portion 126b are electrically connected to one another. Thus, the fourth transparent segments 132d and the first transparent segments 132a form a plurality of connecting portions 126b, i.e., the fourth transparent segments 132d and the first transparent segments 132a may form the second vertical transparent lines 132Vb and the second horizontal transparent lines 132Lb, and are electrically connected to the second transparent segments 132b corresponding to the same first touch electrode strip 126. Further the first metal layer 109 of each of the display pixel units 142d includes a third metal segment 130c, which is insulated from the first metal segment 130a.

Figure 17:
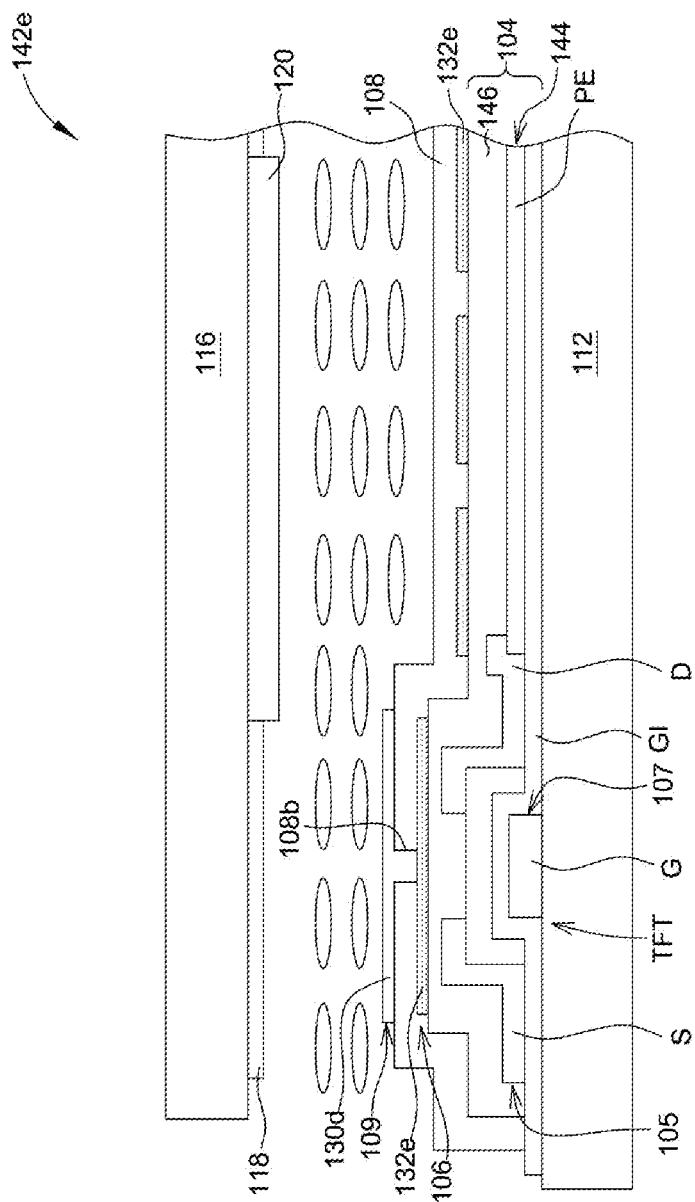
FIG. 17 is a section view of a fifth display pixel unit according to the first embodiment of the present invention.

Referring to FIG. 17 as well as FIG. 9 and FIG. 12, the display pixel units 142 may further include a plurality of fifth display pixel units 142e. The fifth display pixel units 142e correspond to regions where the first connecting lines 138 and the display electrodes 138 connect. Each of the fifth display pixel units 142e includes the first metal layer 109 and the first transparent layer 106. More specifically, the first metal layer 109 of each of the display pixel units 142e includes a fourth metal segment 130d, and the fourth metal segments 130d and the third metal segments 130c corresponding to the same first connecting line 138 are electrically connected, so that the fourth metal segments 130d and the third metal segments 130c may form a plurality of first connecting lines 138. Further, the fourth metal segments 130d are insulated from the second metal segments 130b. Further, the first transparent layer 106 of each of the display pixel units 142e includes a plurality of fifth transparent segments 132e. The fifth transparent segments 132e and the third transparent segments 132c corresponding to the same display electrode 136 are electrically connected, so that the fifth transparent segments 132e and the third transparent segments 132c form a plurality of display electrodes 136. Further, the first insulation layer 108 of each of the fifth display pixel units 142e includes the first through holes 108b, such that the fourth metal segments 130d are allowed to electrically connect to the fifth transparent segments 132e via the first through holes 108b.

Figure 18:
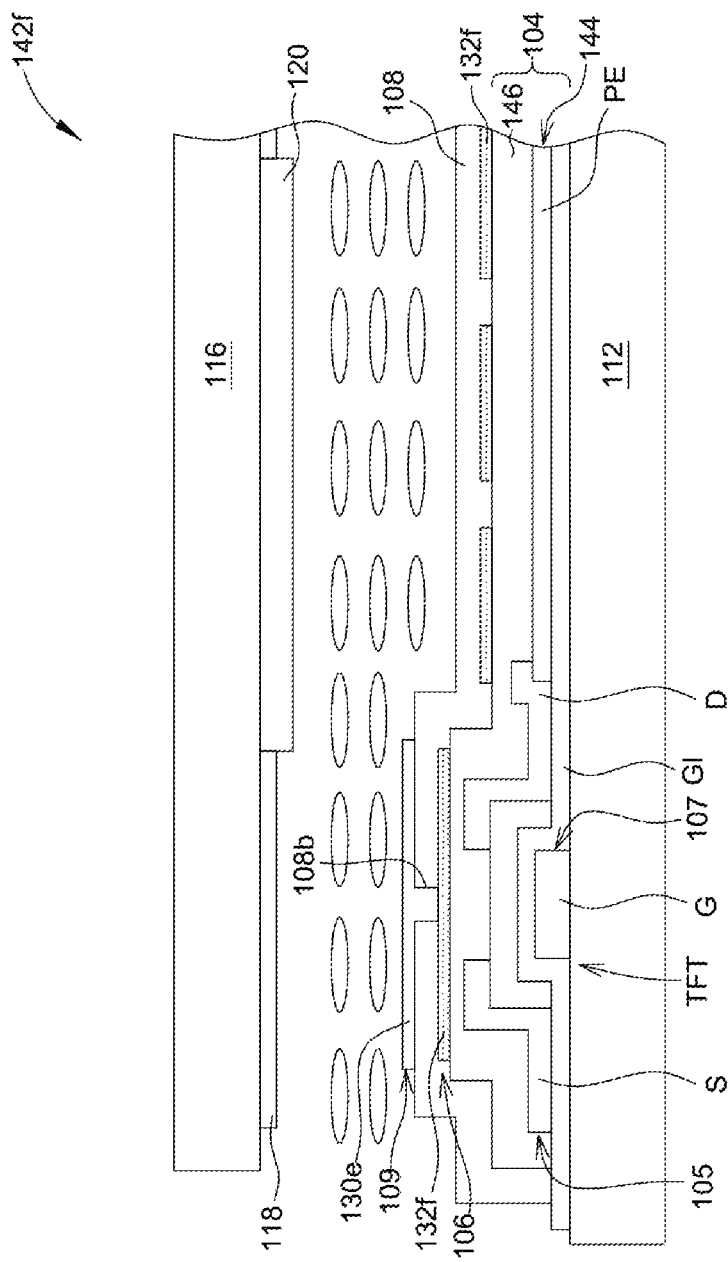
FIG. 18 is a section view of a sixth display pixel unit according to the first embodiment of the present invention.

Referring to FIG. 18 as well as FIG. 9 and FIG. 12, the display pixel units 142 may further include a plurality of sixth display pixel units 142f. The sixth display pixel units 142f correspond to regions where the second connecting lines 140 overlap with the electrode portions 126a. Each of the display pixel units 142f includes the first metal layer 109 and the first transparent layer 106. More specifically, the first metal layer 109 of each of the display pixel units 142f includes a fifth metal segment 130e, and the fifth metal segments 130e of the first metal layer 109 of the sixth display pixel units 142f corresponding to the same second connecting line 140 are electrically connected to one another to form a plurality of second connecting lines 140. Further, the first transparent layer 106 of each of the display pixel units 142f includes a plurality of sixth transparent segments 132f, which are electrically connected to the second transparent segments 132b of the second display pixel units 142b corresponding to the same electrode portion 126a. The first transparent segments 132a corresponding to the first display pixel units 142a, the second transparent segments 132b corresponding to the second display pixel units 142b, the fourth transparent segments 132d corresponding to the fourth display pixel units 142d, and the sixth transparent segments 132f corresponding to the sixth display pixel units 142f corresponding to the electrode portions 126a and the connecting portions 126b of the same first touch electrode strip 126 are electrically connected to one another. The first insulation layer 108 of the sixth display pixel units 142f includes the second through holes 108a, such that the fifth metal segments 130e are allowed to electrically connect to the sixth transparent segments 132f via the second through holes 108a.

The second display pixel units 142b, the third display pixel units 142c, the fourth display pixel units 142d, the fifth display pixel units 142e, and the sixth display pixel units 144f all include the semiconductor stack 104, which is structurally identical to the semiconductor stack 104 of the first display pixel units 142a. Such repeated details shall be omitted herein.

Figure 19:
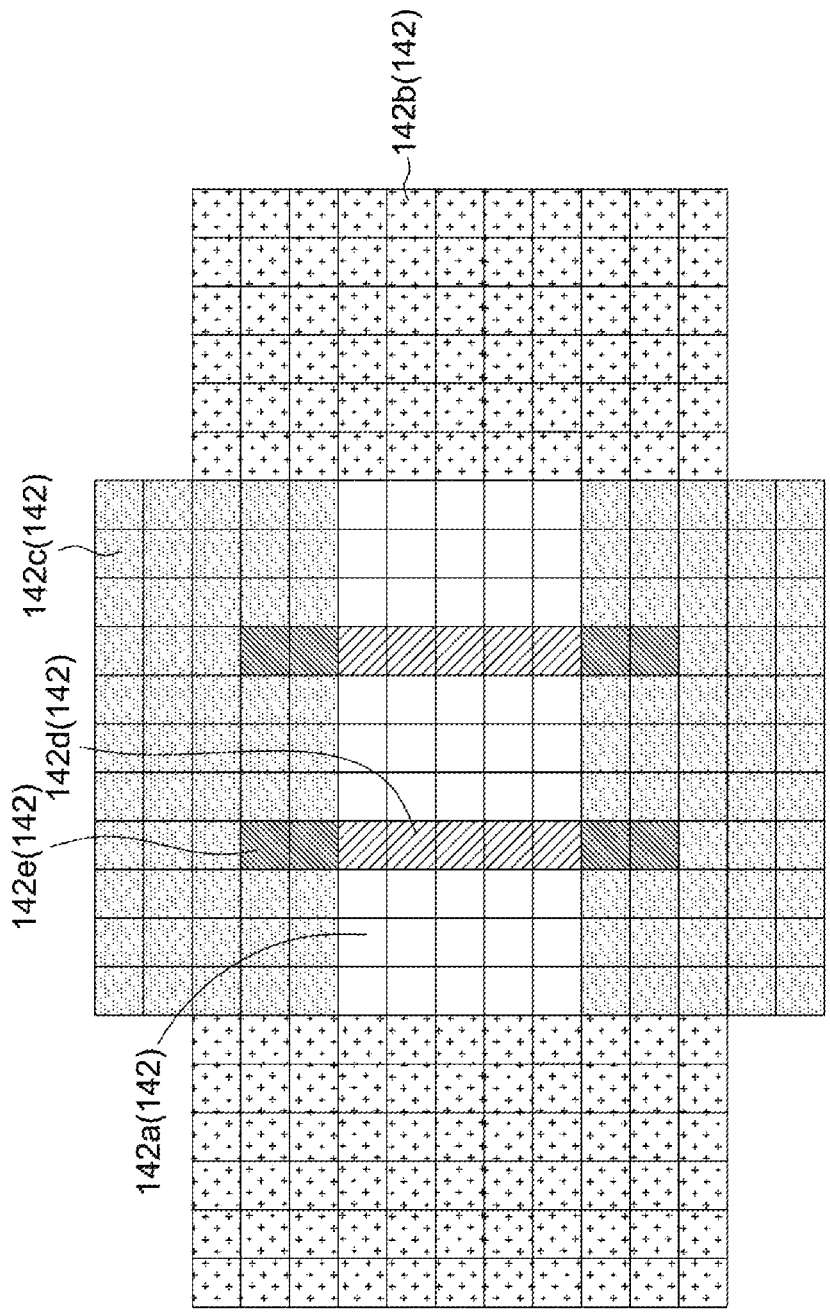
FIG. 19 is a top view of display pixel units according to another embodiment of the present invention.

In another embodiment, the first metal layer may exclude the second connecting lines, and so the display pixel units may also exclude the sixth display pixel units, as shown in FIG. 19. At this point, the first touch electrode strips 126 are formed by the first transparent layers of the first display pixel units 142a, the second display pixel units 142b and the third display pixel units 142c.

The structure of the in-cell touch display panel is not limited to the above embodiments. In the description below, other embodiments or variations of the present invention are further disclosed. For the sake of simplicity and to emphasize differences between the embodiments or variations, the same elements are represented by the same denotations, and such repeated details are to be omitted.

Figure 20:
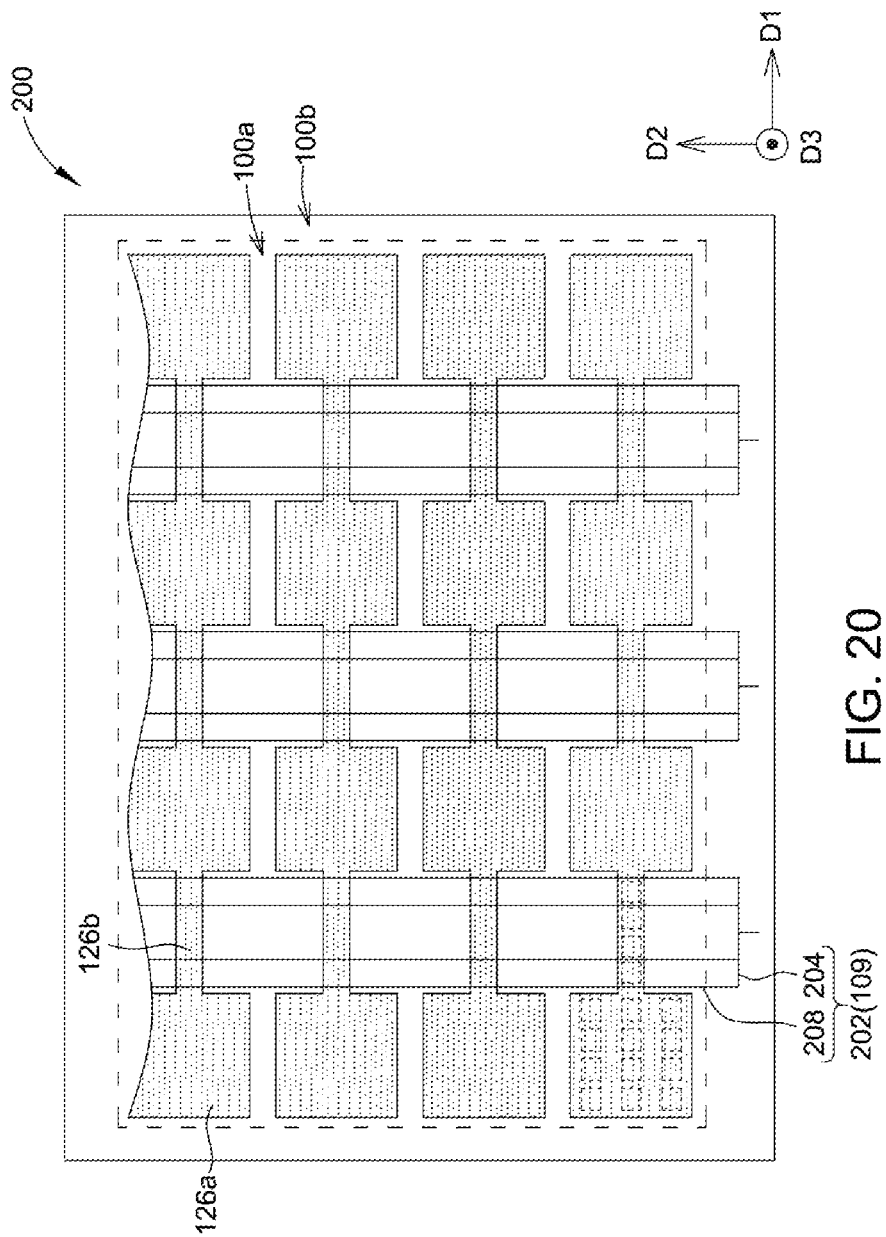
FIG. 20 is a top view of an in-cell touch display panel according to a second embodiment of the present invention.

FIG. 20 shows an in-cell touch display panel 200 according to a second embodiment of the present invention. Compared to the first embodiment, second touch electrode strips 202 of the in-cell touch display panel 200 of the embodiment include only vertical metal lines 208 extending along the second direction, and may electrically connect to one another via different connecting strips 204. For example, the first metal layer 109 may further include a plurality of connecting strips 204. The connecting lines 204 are disposed in the border region 100b, and extend along a direction different from the second direction D2, e.g., extending along the first direction D1. In another embodiment, the connecting strips may be formed by a conductive layer other than the first metal layer. Alternatively, the first metal layer may further include metal lines. The metal lines are disposed in the active region and shielded by the black matrix, and extend along a direction different from the second direction to connect the vertical metal lines of the second touch electrode strips.

In conclusion, the touch sensor of the present invention may be disposed in the display panel without attaching an additional touch panel to the display panel. Further, the first touch electrode strips and the second touch electrode strips of the touch sensor may be formed by the first transparent layer and the first metal layer, respectively, such that through holes are not required for forming the first touch electrode strips and the second touch electrode strips through connection. Further, when the display electrodes serve as a common electrode, the display electrodes may be electrically connected via the first connecting lines formed by the first metal layer to electrically connect the display electrodes to a same common voltage, thereby preventing the in-cell touch display panel from displaying unsatisfactory images.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An in-cell touch display panel, comprising:
    a first substrate;
    a semiconductor stack, disposed on the first substrate, comprising a plurality of pixel control elements;
    a transparent layer, disposed on the semiconductor stack, comprising a plurality of first touch electrode strips extending along a first direction;
    an insulation layer, disposed on the transparent layer; and
    a metal layer, disposed on the insulation layer, comprising a plurality of second touch electrode strips extending along a second direction;
    wherein, the first touch electrode strips intersect and are insulated from the second touch electrode strips, and
    wherein each of the first touch electrode strips comprises a plurality of electrode portions and a plurality of connecting portions, each of the connecting portions connects two adjacent electrode portions, and a width of each of the connecting portions in the second direction is smaller than a width of each of the electrode portions.

2. The in-cell touch display panel according to claim 1, wherein each of the connecting portions overlaps with and is insulated from one of the second touch electrode strips in a third direction perpendicular to the first substrate.

3. The in-cell touch display panel according to claim 1, wherein the metal layer comprises a plurality of first connecting lines, and each of the first connecting lines overlaps with and electrically connects to at least one of the electrode portions in a third direction perpendicular to the first substrate.

4. The in-cell touch display panel according to claim 3, wherein the insulation layer comprises a plurality of through holes, and each of the first connecting lines electrically connects to at least one of the electrode portions via at least two of the first through holes.

5. The in-cell touch display panel according to claim 1, wherein one of the first touch electrode strips is utilized to transmit a touch signal in a touch control period, and to transmit a common voltage in a display period.

6. The in-cell touch display panel according to claim 1, wherein each of the second touch electrode strips comprises a plurality of metal lines that intersect and connect to one another.

7. The in-cell touch display panel according to claim 1, wherein each of second touch electrode strips comprises a plurality of metal lines that extend along the second direction and electrically connect to one another.

8. The in-cell touch display panel according to claim 1, wherein the transparent layer further comprises a plurality of display electrodes, and the display electrodes disposed along the second direction overlap with one of the second touch electrode strips in a third direction perpendicular to the first substrate.

9. The in-cell touch display panel according to claim 8, wherein the metal layer further comprises a plurality of second connecting lines that extend along the second direction and are insulated from the second touch electrode strips, and each of the second connecting lines electrically connects to at least two of the display electrodes.

10. The in-cell touch display panel according to claim 9, wherein the insulation layer comprises a plurality of second through holes, and each of the second connecting lines electrically connects to the at least two of the display electrodes disposed in the second direction via at least two of the second through holes.

11. The in-cell touch display panel according to claim 8, wherein the metal layer further comprises a plurality of third connecting lines that extend along the first direction and are insulated from the second touch electrode strips, and each of the third connecting lines electrically connects to at least two of the display electrodes.

12. The in-cell touch display panel according to claim 8, wherein at least one of the display electrodes electrically connects to a common voltage in a display period.

13. The in-cell touch display panel according to claim 1, further comprising:

a black matrix, disposed on the metal layer, shielding the metal layer in a third direction perpendicular to the first substrate.

14. The in-cell touch display panel according to claim 13, wherein the black matrix comprises a plurality of openings, each of the second touch electrode strips comprises a plurality of metal lines that extend along the second direction and electrically connect to one another, and a gap between any two adjacent metal lines is greater than or equal to a width of each of the openings in the first direction.

15. The in-cell touch display panel according to claim 13, wherein the black matrix comprises a plurality of openings, each of the first touch electrode strips comprises a plurality of transparent lines that extend along the second direction, and a gap between any two adjacent transparent lines is smaller than a width of each of the openings in the first direction.

16. An in-cell touch display panel having a transparent layer and a metal layer, comprising:
a plurality of first display pixel units, each comprising a first transparent segment disposed in the transparent layer and a first metal segment disposed in the metal layer;
a plurality of second display pixel units, each comprising a second transparent segment disposed in the transparent layer;
a plurality of third display pixel units, each comprising a second metal segment disposed in the metal layer; and
a plurality of fourth display pixel units, each comprising a fourth transparent segment disposed in the transparent layer and a third metal segment disposed in the metal layer,
wherein, the first transparent segments and the second transparent segments form a plurality of first touch electrode strips extending along a first direction; the first metal segments and the second metal segments form a plurality of second touch electrode strips extending along a second direction; the first touch electrode strips intersect and are insulated from the second touch electrode strips, and
wherein, the fourth transparent segments electrically connect to the first touch electrode strips, and the third metal segments are insulated from the second touch electrode strips.

17. The in-cell touch display panel according to claim 16, further comprising:
a plurality of fifth display pixel units, each comprising a fifth transparent segment disposed in the transparent layer;
wherein, each of the third display pixel units further comprises a third transparent segment disposed in the transparent layer, and the third transparent segments and the fifth transparent segments form a plurality of display electrodes.

18. The in-cell touch display panel according to claim 17, wherein each of the fifth display pixel units further comprises a fourth metal segment disposed in the metal layer, the third metal segments and the fourth metal segments form a plurality of first connecting lines insulated from the second touch electrode strips, and each of the first connecting lines electrically connects to at least two of the display electrodes disposed along the second direction.

19. The in-cell touch display panel according to claim 16, wherein the first transparent segments and the fourth transparent segments form a plurality of connecting portions, the second transparent segments form a plurality of electrode portions, each of the connecting portions connects two adjacent electrode portions along the first direction, and a width of each of the connecting portions is smaller than a width of each of the electrode portions in the second direction.

20. The in-cell touch display panel according to claim 19, further comprising:
a plurality of sixth display pixel units, each comprising a fifth metal segment disposed in the metal layer, the fifth metal segments forming a plurality of second connecting lines;
wherein, the second connecting lines overlap with and electrically connect to at least one of the electrode portions.

21. An in-cell touch display panel, comprising:
a first substrate;
a semiconductor stack, disposed on the first substrate, comprising a plurality of pixel control elements;
a transparent layer, disposed on the semiconductor stack, comprising a plurality of first touch electrode strips extending along a first direction;
an insulation layer, disposed on the transparent layer;
a metal layer, disposed on the insulation layer, comprising a plurality of second touch electrode strips extending along a second direction; and
a black matrix, disposed on the metal layer, shielding the metal layer in a third direction perpendicular to the first substrate, wherein the black matrix comprises a plurality of openings, each of the first touch electrode strips comprises a plurality of transparent lines that extend along the second direction, and a gap between any two adjacent transparent lines is smaller than a width of each of the openings in the first direction,
wherein, the first touch electrode strips intersect and are insulated from the second touch electrode strips.

22. An in-cell touch display panel, comprising:
a first substrate;
a semiconductor stack, disposed on the first substrate, comprising a plurality of pixel control elements;
a transparent layer, disposed on the semiconductor stack, comprising a plurality of first touch electrode strips extending along a first direction;
an insulation layer, disposed on the transparent layer; and
a metal layer, disposed on the insulation layer, comprising a plurality of second touch electrode strips extending along a second direction;
wherein, the first touch electrode strips intersect and are insulated from the second touch electrode strips, and
wherein the transparent layer further comprises a plurality of display electrodes, and the display electrodes disposed along the second direction overlap with one of the second touch electrode strips in a third direction perpendicular to the first substrate.

* * * * *